United States Patent
Kim et al.

(10) Patent No.: US 11,328,487 B2
(45) Date of Patent: May 10, 2022

(54) METHOD AND PROGRAM FOR PROVIDING AUGMENTED REALITY IMAGE BY USING DEPTH DATA

(71) Applicant: CLICKED, INC., Seoul (KR)

(72) Inventors: Tae Wook Kim, Yangju-si (KR); Ha Ram Lee, Seoul (KR); Duk Young Jung, Seoul (KR)

(73) Assignee: CLICKED, INC., Seoul (KR)

( * ) Notice: Subject to any disclaimer, the term of this patent is extended or adjusted under 35 U.S.C. 154(b) by 61 days.

(21) Appl. No.: 16/887,451

(22) Filed: May 29, 2020

(65) Prior Publication Data

US 2020/0334911 A1 Oct. 22, 2020

Related U.S. Application Data

(63) Continuation of application No. PCT/KR2018/014882, filed on Nov. 28, 2018.

(30) Foreign Application Priority Data

Dec. 1, 2017 (KR) .................... 10-2017-0163867

(51) Int. Cl.
*G06T 19/00* (2011.01)
*G06T 7/73* (2017.01)
*G06T 19/20* (2011.01)

(52) U.S. Cl.
CPC ............. *G06T 19/006* (2013.01); *G06T 7/74* (2017.01); *G06T 19/20* (2013.01); *G06T 2207/10024* (2013.01); *G06T 2207/10028* (2013.01); *G06T 2219/2012* (2013.01)

(58) Field of Classification Search
CPC .......... G06T 19/006; G06T 7/74; G06T 19/20
USPC .......................................................... 345/633
See application file for complete search history.

(56) References Cited

U.S. PATENT DOCUMENTS 9,818,224 B1 * 11/2017 Worley ................ H04N 13/275
2015/0147046 A1 * 5/2015 Van Broeck ......... H04N 13/178
386/278

FOREIGN PATENT DOCUMENTS

| JP | H11136706 A | 5/1999 |
| JP | 2009-083764 A | 4/2009 |
| JP | 2014-116878 A | 6/2014 |
| JP | WO 2013/187129 A1 | 2/2016 |

(Continued)

OTHER PUBLICATIONS

International Search Report issued in PCT/KR2018/014882; dated Mar. 11, 2019.

(Continued)

*Primary Examiner* — Thomas J Lett
(74) *Attorney, Agent, or Firm* — Studebaker & Brackett PC

(57) ABSTRACT

Embodiments of the inventive concept described herein relate to a method and a program for providing augmented reality image using depth data. According to an embodiment of the inventive concept, a method for providing an AR image using depth data includes a step S120 (a virtual image data receiving step) of receiving, by a client, virtual image data from a server, a step S140 (a display location determining step) of determining, by the client, a location, at which each pixel is to be displayed in a reality space, based on the depth data, and a step S160 (a virtual image data displaying step) of displaying the virtual image data in the reality space based on the determined location.

9 Claims, 6 Drawing Sheets

(56) References Cited

FOREIGN PATENT DOCUMENTS

| | | |
|---|---|---|
| JP | WO2014/156706 A1 | 2/2017 |
| KR | 20110059790 A | 6/2011 |
| KR | 20110107545 A | 10/2011 |
| KR | 20160034513 A | 3/2016 |
| KR | 101724360 B1 | 4/2017 |

OTHER PUBLICATIONS

An Office Action; "Notice of Reasons for Refusal", mailed by the Japanese Patent Office dated Oct. 5, 2021, which corresponds to Japanese Patent Application No. 2020-549532 and is related to U.S. Appl. No. 16/887,451.

\* cited by examiner

Comparing current location data obtained from client with acquisition location data and comparing playback direction data obtained from client with image direction data
(S143)

Adjusting location of pixel in virtual image data based on comparison result
(S144)

METHOD AND PROGRAM FOR PROVIDING AUGMENTED REALITY IMAGE BY USING DEPTH DATA

CROSS-REFERENCE TO RELATED APPLICATIONS

The present application is a continuation of International Patent Application No. PCT/KR2018/014882, filed Nov. 28, 2018, which is based upon and claims the benefit of priority to Korean Patent Application No. 10-2017-0163867, filed on Dec. 1, 2017. The disclosures of the above-listed applications are hereby incorporated by reference herein in their entirety.

BACKGROUND

Embodiments of the inventive concept described herein relate to a method and a program for providing augmented reality image using depth data.

Augmented reality (AR) refers to a technology for superimposing virtual objects such as texts and graphics in a real world and displaying the virtual objects as an image. The AR technology was in R&D and test application steps until the mid-2000s. However, the AR technology has recently entered the commercialization step as the technological environment is in place. In particular, with the advent of smartphones and the development of Internet technology, the AR technology has started to draw attention.

The most common way to implement AR is to make the user feel as if a virtual reality and an actual reality are mixed, by photographing the real world using the camera of a smartphone and overlaying and outputting the pre-generated computer graphics on the photographed image. In this method, most AR applications are implemented in smartphones because a user may easily obtain the image of reality using the camera of the smartphone, and computer graphics may be easily implemented through the computing function of the smartphone. Besides, with the recent advent of wearable devices in the form of glasses, the interest in the AR technology is increasing.

SUMMARY

The AR image needs to be augmented at the correct location in the reality space to provide a user with a sense of reality. However, in the case where the spatial placement of an object (e.g., a marker) with which the AR image is combined is changed as a user moves, when the image frame at a specific time point is missing, the AR image may be placed at an inappropriate location, and may be unnaturally displayed in the reality space and the sense of reality decreases as the AR image shakes. Embodiments of the inventive concept provide a method and a program for providing augmented reality image using depth data, which provides a realistic and unshakable AR image even when a user moves or a frame is missing, by placing the virtual image data, which is a two-dimensional image at an appropriate location in the reality space using depth data.

Embodiments of the inventive concept provide a method and a program for providing augmented reality image using depth data that may generate an AR image without additional masking data by assigning a region to be transparent to each pixel of a virtual reality (VR) image based on added depth data.

Moreover, embodiments of the inventive concept provide a method and a program for providing augmented reality image using depth data that may transform VR content and may utilize the transformed VR content as AR content, without separately producing an AR image augmented and expressed in a reality space separately from the VR image.

The technical problems to be solved by the present inventive concept are not limited to the aforementioned problems, and any other technical problems not mentioned herein will be clearly understood from the following description by those skilled in the art to which the inventive concept pertains.

According to an exemplary embodiment, a method in which a client provides an augmented reality (AR) image includes receiving, by the client, virtual image data from a server, wherein the virtual image data includes color data and depth data, determining, by the client, a location, at which each pixel is to be displayed in a reality space, based on the depth data, and displaying the virtual image data in the reality space based on the determined location.

Furthermore, in another embodiment, the depth data is included in a separate channel distinguished from a color data channel for each pixel, and the depth data and the color data are synchronized and transmitted.

Moreover, in another embodiment, the virtual image data is a two-dimensional image stored for each pixel by obtaining depth data at each point during capture or generation.

Also, in another embodiment, the determining of the location includes determining, by the client, a specific depth as a transparency adjustment criterion and determining whether to perform transparency processing, by distinguishing a depth range based on the transparency adjustment criterion. The transparency adjustment criterion is to set a boundary line of content to be displayed on a screen.

In addition, in another embodiment, the depth range is a plurality of regions divided based on a plurality of depths by setting the plurality of depths depending on the transparency adjustment criterion.

Furthermore, in another embodiment, the virtual image data further includes acquisition location data and image direction data. The determining of the location includes comparing current location data obtained by the client with the acquisition location data and comparing playback direction data obtained by the client with the image direction data and adjusting a location of a pixel in the virtual image data based on the comparison result.

Moreover, in another embodiment, the determining of the location further includes adjusting, by the client, a color or a chroma of each pixel in the virtual image data based on a light irradiation direction of a reality space.

Furthermore, in another embodiment, the method further include correcting, by the client, reality image data based on an output delay time, when the client is a device for outputting combined image data obtained by combining the virtual image data and reality image data obtained by a camera. The output delay time is a time required until the captured reality image data is output on a screen after the reality image data is captured.

According to an exemplary embodiment, a program for providing an AR image using depth data that is stored in a medium to execute the above-described method for providing an AR image using depth data in combination with a computer that is a piece of hardware.

According to an exemplary embodiment, a device providing an AR image includes a virtual image data receiving unit receiving virtual image data from a server, a control unit determining a location, at which each pixel is to be displayed in a reality space, based on the depth data, and an image output unit displaying the virtual image data in a reality space based on the determined location. The virtual image data includes color data and depth data.

According to an exemplary embodiment, a method in which a server generates virtual image data for implementing AR in a client includes obtaining, by the server, color data for each pixel of the virtual image data provided to the client at a specific time point, obtaining and storing depth data for each pixel of the virtual image data, and synchronizing, by the server, the color data and the depth data to transmit the synchronized color data and the synchronized depth data to the client. The depth data is used during correction based on first virtual image data at a first time point when second virtual image data at a second time point is not received. The second time point is a time point at which a virtual image data transmission period elapses from the first time point.

Furthermore, in another embodiment, the virtual image data further includes acquisition location data and image direction data. The client compares current location data with the acquisition location data, compares playback direction data with the image direction data, and adjusts a location of a pixel in the virtual image data based on the comparison result, and the current location data and the playback direction data are obtained by the client in real time or at a unit time.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
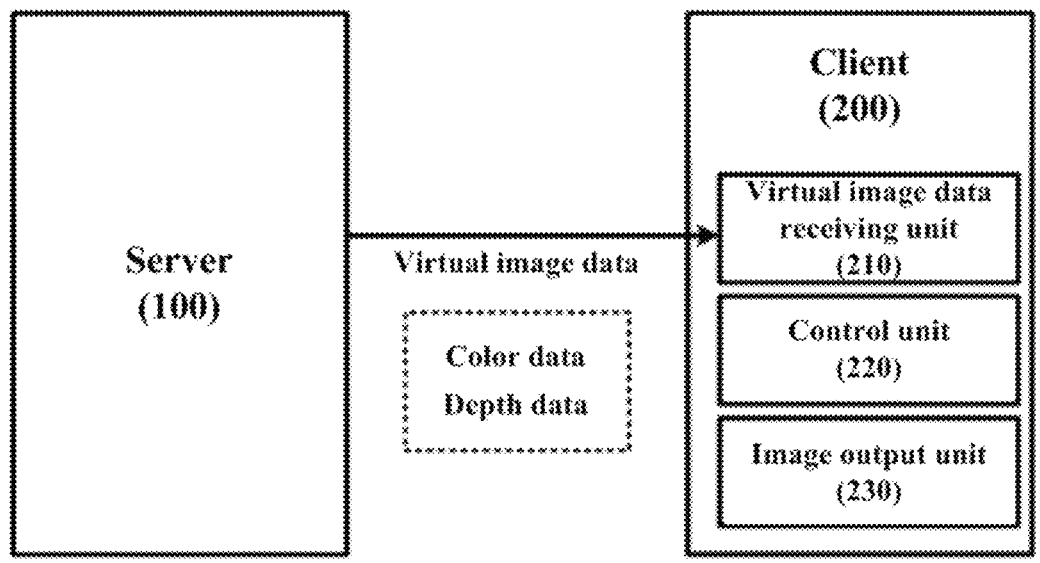
FIG. 1 is a structural diagram of an AR image system according to an embodiment of the inventive concept.

Hereinafter, exemplary embodiments of the inventive concept will be described in detail with reference to the accompanying drawings. The above and other aspects, features and advantages of the inventive concept will become apparent from the following description of the following embodiments given in conjunction with the accompanying drawings. However, the inventive concept is not limited to the embodiments disclosed below, but may be implemented in various forms. The embodiments of the inventive concept is provided to make the disclosure of the inventive concept complete and fully inform those skilled in the art to which the inventive concept pertains of the scope of the inventive concept. The same reference numerals denote the same elements throughout the specification.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

The terminology used herein is for the purpose of describing embodiments and is not intended to limit the inventive concept. In the specification, the singular forms include plural forms unless particularly mentioned. The terms "comprises" and/or "comprising" used herein does not exclude presence or addition of one or more other elements, in addition to the aforementioned elements.

In this specification, 'virtual image data' refers to image data produced to implement VR or AR. The 'virtual image data' may be generated by capturing a reality space through a camera or may be produced through a modeling process.

In this specification, 'first virtual image data' refers to virtual image data provided from a server to a client at a first time point. In this specification, 'second virtual image data' refers to virtual image data provided from the server to the client at the second time point (i.e., the time when the unit time being an image reception period has elapsed from the first time point).

In this specification, 'depth data' is a value of depth in a 3D space, and is a value assigned to each subunit (e.g., each pixel) divided in specific virtual image data.

In this specification, 'color data' refers to data regarding a color used when the virtual image data is displayed on a screen. For example, the color data may be included for each pixel of the virtual image data. Further, the 'color data' may be implemented with a specific color model capable of expressing colors, such as a Red-Green-Blue (RGB) color model.

In this specification, 'reality image data' refers to image data obtained by capturing a reality space.

In this specification, a 'client' refers to an AR image playback device that receives and plays virtual image data from the server. That is, the 'client' refers to all devices capable of displaying and providing reality image data and AR content obtained by capturing a reality image or a reality space provided directly to the user's eyes.

Hereinafter, a method and a program for providing an AR image using depth data according to an embodiment of the inventive concept will be described in detail with reference to the drawings.

FIG. 1 is a structural diagram of an AR image system according to an embodiment of the inventive concept.

Figure 2:
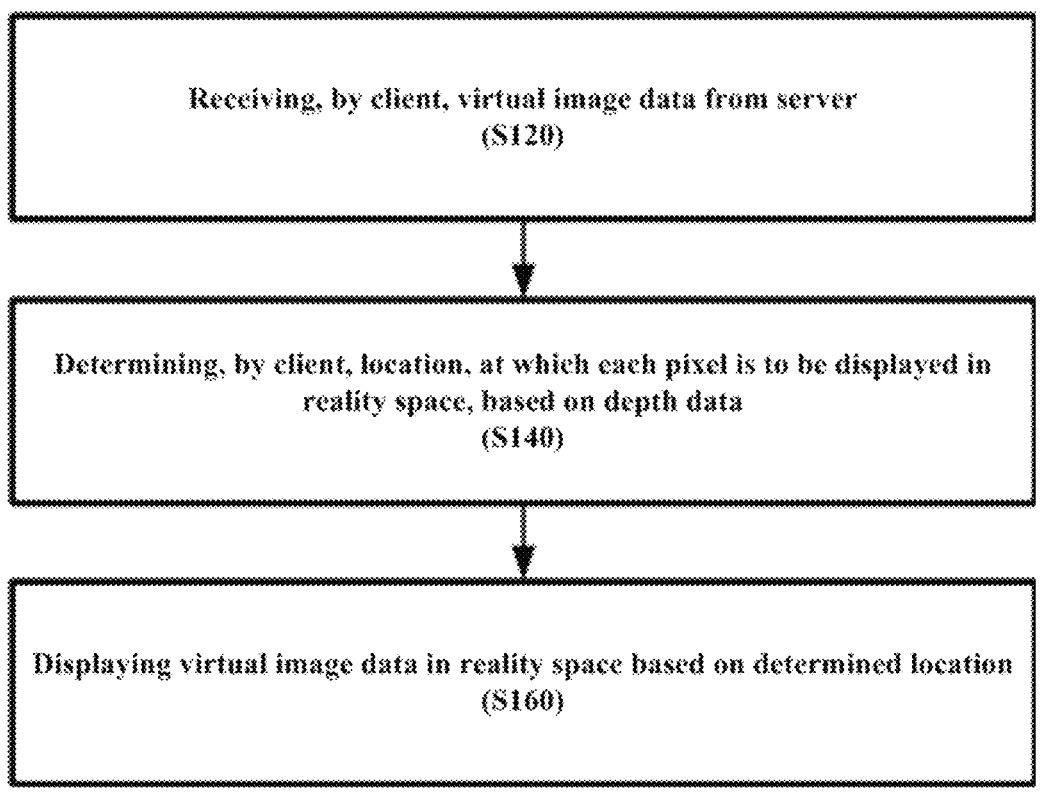
FIG. 2 is a flowchart of a method, in which a client provides an AR image using depth data, according to an embodiment of the inventive concept.

FIG. 2 is a flowchart of an AR image providing method using depth data according to an embodiment of the inventive concept.

Referring to FIGS. 1 and 2, according to an embodiment of the inventive concept, a method for providing an AR image using depth data includes a step S120 (a virtual image data receiving step) of receiving, by a client 200, virtual image data from a server 100, a step S140 (a display location determining step) of determining, by the client 200, a location, at which each pixel is to be displayed in a reality space, based on the depth data, and a step S160 (a virtual image data displaying step) of displaying the virtual image data in the reality space based on the determined location. Hereinafter, the detailed description about each step is provided.

The client 200 receives the virtual image data from the server 100 (S120; a virtual image data receiving step). The virtual image data includes color data and depth data.

In an embodiment, the virtual image data is a two-dimensional (2D) image stored for each pixel by obtaining depth data of each point during capture or generation. That is, the client 200 receives virtual image data, which is a 2D image including depth data, and generates AR image in a three-dimensional (3D) reality space. In this way, the client 200 may implement realistic AR in a 3D reality space without receiving 3D image data of high capacity modeled in 3D from the server 100.

In an embodiment, the depth data is included in a separate channel distinguished from a color data channel for each pixel. That is, the server 100 transmits color data and depth data for each pixel of virtual image data to the client 200 through a color data channel and a depth data channel. At this time, the server 100 synchronizes and transmits depth data transmitted through a depth data channel and color data transmitted through a color data channel to the client 200. The client 200 obtains color data and depth data for each pixel simultaneously received through the color data channel and the depth data channel, as virtual image data at a corresponding time point.

The client 200 determines a location, at which each pixel is to be displayed in a reality space, based on the depth data (S140; a display location determining step). That is, the client 200 determines to display color data at a depth corresponding to depth data at a reality space location visible to a user through the client 200 corresponding to each pixel location of virtual image data. In particular, when the client 200 is a device (e.g., a glass-type wearable device) that outputs virtual image data on a transparent screen, the virtual image data corresponds to the screen size of the device, and thus the client 200 outputs each pixel of the virtual image data based on depth data at a corresponding point on the screen.

Figure 3:
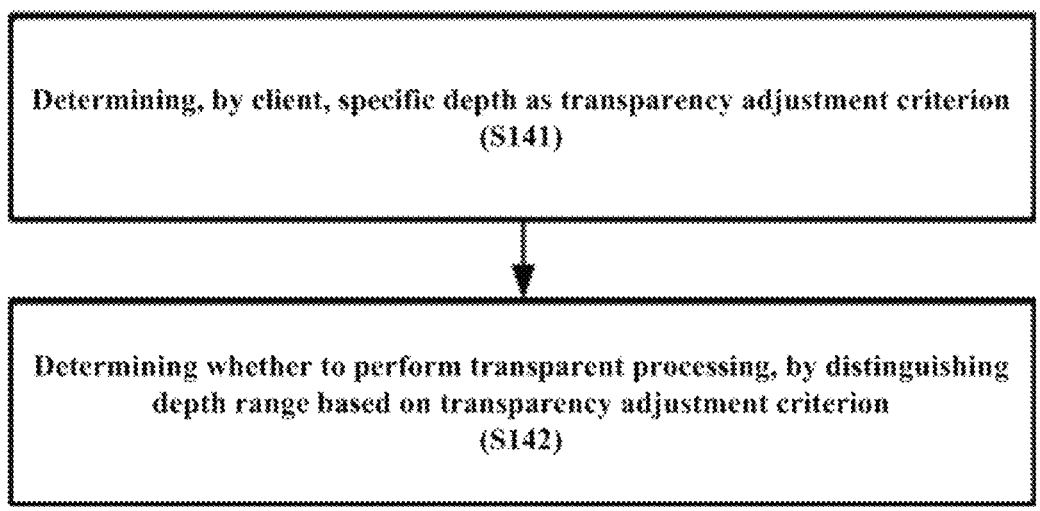
FIG. 3 is a flowchart for a process of adjusting transparency of virtual image data based on depth data according to an embodiment of the inventive concept.

Furthermore, in another embodiment, as illustrated in FIG. 3, the display location determining step S140 includes a step S141 of determining, by the client 200, a specific depth as a transparency adjustment criterion and a step S142 of determining whether to perform transparent processing, by distinguishing a depth range based on the transparency adjustment criterion. That is, the client 200 designates an output region based on the depth data to output only the desired portion of the desired virtual image data in the reality space.

Figure 4:
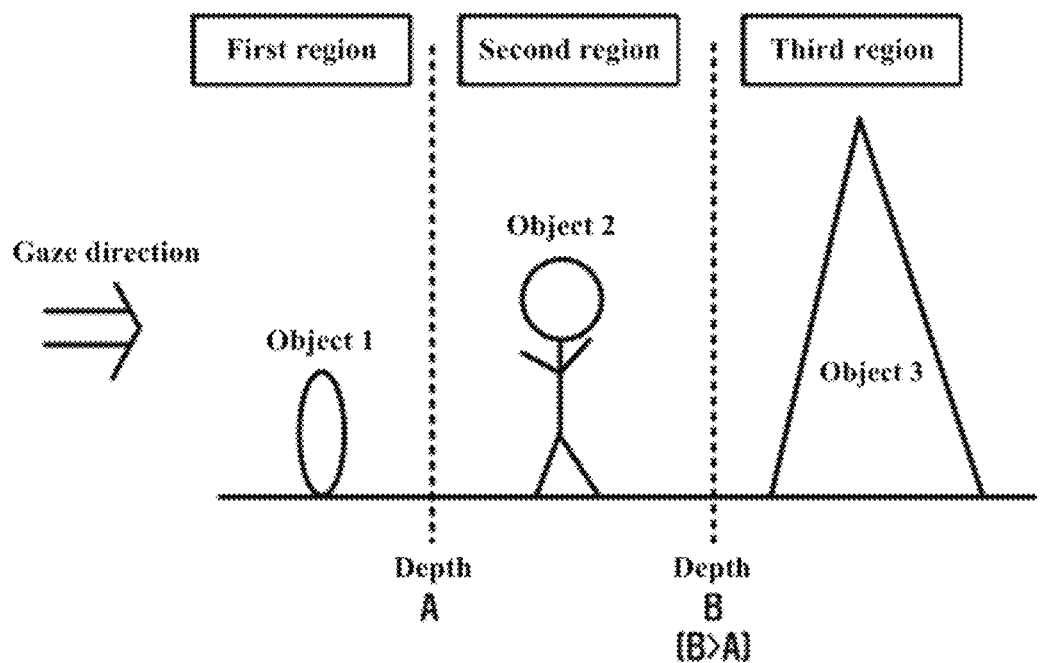
FIG. 4 is an exemplary diagram of setting a transparency adjustment criterion based on depth data and dividing regions according to an embodiment of the inventive concept.

First, the client 200 determines a specific depth as a transparency adjustment criterion (S141). The transparency adjustment criterion may be a depth value corresponding to a boundary line of content to be displayed on a screen. For example, as illustrated in FIG. 4, when the client 200 wants to display only the characters included in the virtual image data as AR content, the client 200 determines the depth data of the pixel corresponding to the boundary line of the character based on the transparency adjustment criterion. In this way, the client 200 allows only the characters (e.g., object 2) in virtual image data to be displayed on the screen, and may process the remaining regions transparently.

Afterward, the client 200 distinguishes the depth range based on the transparency adjustment criterion (S142). That is, the client 200 divides the region into regions closer than a specific depth and regions farther than the specific depth. The client 200 may set a plurality of depths as the transparency adjustment criterion. For example, as illustrated in FIG. 4, when the transparency adjustment criterion is set to 2 depth values (e.g., 2 depth values being depth value A and depth value B (B is greater than A)), the client 200 distinguishes the depth range into a first region closer than depth A, a second region between depth A and depth B, and a third region farther than depth B.

Afterward, the client 200 applies whether to perform transparent processing to the distinguished depth range (S142). In an embodiment, in case of distinguishing depth range based on the specific depth value (e.g., depth value A), the client 200 determines a region farther than depth A as a transparent processing region, such that only an image in a range closer than depth A is displayed on a screen. Furthermore, in another embodiment, when the region is divided into three or more depth ranges by setting two or more transparency adjustment criterions, the client 200 determines whether to process each depth range transparently. Moreover, the client 200 may determine the transparency value with respect to each depth range, and may also process the image content included in the specific depth range to be translucent to be seen together with the reality space.

In this way, the client 200 may extract the desired content (e.g., an object) from the virtual image data through depth data and may display the desired content on reality image data. That is, the client 200 sets the masking region, using the depth data received together to display the virtual image at an appropriate location in the reality space, and thus the client 200 does not need to separately receive masking data for masking some regions in the virtual image data from the server 100. For example, when an AR image is implemented by adding only the depth data to the generated image for realizing the conventional VR image, as the service provider generates only the depth data of each pixel synchronized with the conventional VR image and sets the specific depth corresponding to the boundary of a specific object in the virtual image data, the service provider may implement the VR image as an AR image in which some regions are masked.

Figures 5, 6:
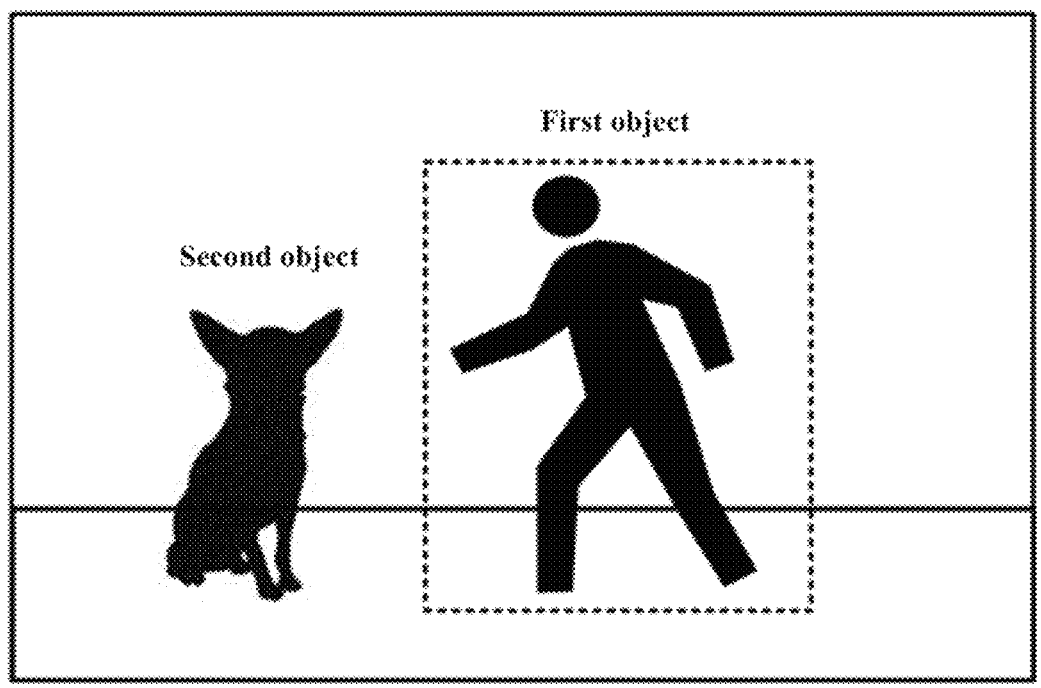
FIG. 5 is an exemplary diagram of inputting region designation data according to an embodiment of the inventive concept.
FIG. 6 is a flowchart for a process of adjusting a location of each pixel in a space according to an embodiment of the inventive concept.

Furthermore, in another embodiment, as illustrated in FIG. 5, the client 200 utilizes region designation data as transparency adjustment criterion together with specific depth data. The virtual image data may include another object (e.g., the second object in FIG. 5) having the same depth value as the object (e.g., the first object in FIG. 5) to be augmented in the reality space. At this time, when the region to be exposed without being transparent to the reality space is set using only depth data, an object that does not need to be displayed may be displayed together in the reality space. Accordingly, the client 200 may receive data (i.e., region designation data) regarding a region in a 2D screen to be transparently processed from the server 100 and may display only image content of a depth range designated as a region to be displayed among image content included in a specified 2D region on the screen. The server 100 may distinguish in detail the parts to be transparent within a specific designated region by depth data, and thus the server 100 may set the region designation data in a shape (e.g., a rectangular shape) for designating only the approximate region and may transmits the region designation data to the client 200.

Furthermore, in another embodiment, in the display location determining step S140, when the direction in which the client 200 is viewed by the user is the same as the direction in which virtual image data is captured, the client 200 may adjust the virtual image data in the shape suitable to display on the screen.

To this end, the virtual image data may further include acquisition location data and image direction data. The acquisition location data refers to a camera location upon shooting virtual image data or upon generating (i.e., modeling) virtual image data. The image direction data refers to the direction in which virtual image data is obtained at the acquisition location. For example, when virtual image data is captured by the camera device, the image direction data may be the direction in which the camera faces at a specific acquisition location, and may be obtained by a sensor included in the camera device. Furthermore, for example, when virtual image data is generated through the modeling process in the external server 100, the image direction data may be a direction set to the corresponding virtual image data during modeling based on an acquisition location criterion.

As illustrated in FIG. 6, an embodiment of the display location determining step S140 using the acquisition location data and image direction data includes a step S143 of comparing the current location data obtained from the client 200 and the acquisition location data and comparing the playback direction data obtained from the client 200 and the image direction data and a step S144 of adjusting a location of a pixel in the virtual image data based on the comparison result.

First, the client 200 compares the current location data with the acquisition location data, and compares the playback direction data obtained from the client 200 with the image direction data (S143). The current location data refers to location data obtained based on at least one of various positioning methods in the client 200. The playback direction data refers to data obtained by a motion sensor inside the client 200, and refers to data for a real-time direction in which the client 200 faces. The client 200 compares the location and the shooting direction (i.e., an image direction), where the virtual image data is obtained, with the current location and the viewing direction (i.e., a playback direction) and calculates a difference value. That is, the client 200 calculates the difference (e.g., a location change in space) between the location where the image is obtained and the current location and calculates the difference (e.g., a difference in an azimuth value) between the viewing direction of the client 200 and the direction in which virtual image data is obtained.

Afterward, the client 200 adjusts the location of a pixel in the virtual image data based on the comparison result (S144). The client 200 adjusts the location of each pixel of virtual image data to be suitable for the current location data and the playback direction data. The client 200 may adjust the depth displayed in the reality space by reflecting the comparison result to the depth data of each pixel as well as the location on the 2D screen of each pixel.

In this way, even when the location and direction in which the user views the AR image from the reality space to the client 200 does not exactly match the location and direction where the virtual image data is obtained, the client 200 may display the AR content at the correct location by adjusting the display location on the screen of each pixel in the virtual image data.

Figure 7:
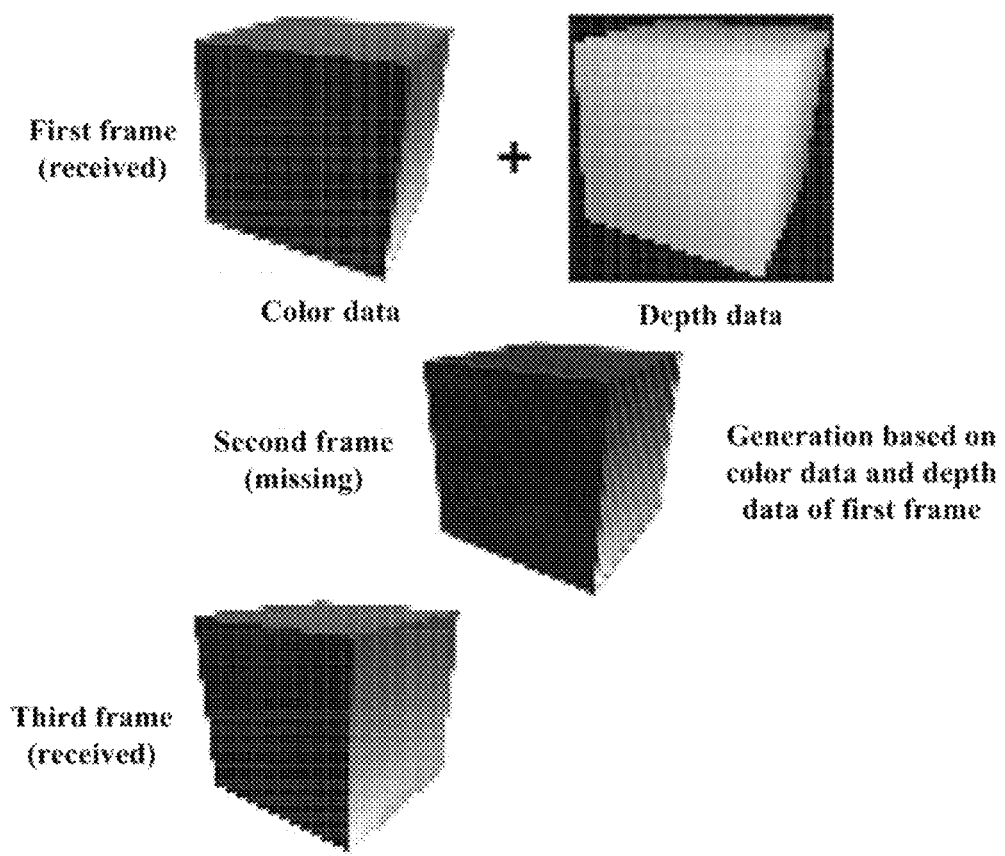
FIG. 7 is an exemplary diagram of generating a missing second frame based on color data and depth data of a first frame according to an embodiment of the inventive concept.

Furthermore, as illustrated in FIG. 7, when a part of frames continuously provided at unit time intervals is missing in the virtual image data (e.g., when the second virtual image data (i.e., the second frame) that needs to be provided at the second time point after first virtual image data (i.e., the first frame) is received at the first time point is missing), the client 200 compares the acquisition location data and image direction data, which are included in the first virtual image data, with the current location data and playback direction data, which are obtained from the client 200 at the second time point, and adjusts the location of each pixel in the first virtual image data based on the comparison result (i.e., the difference in location in a space and the difference in viewing direction). The second time point may be a time point at which the transmission period of the virtual image data has elapsed from the first time point. That is, the client 200 generates and provides second correction image data for replacing the missing second frame by moving each pixel having color data and depth data, which are included in the first frame (i.e., the first virtual image data) based on the comparison result of comparing the acquisition location data and image direction data, which are included in the first frame, with the current location data and playback direction data, which are obtained from the client 200 at the second time point. In this way, when the virtual image data provided from the server 100 is missing, the AR content may be naturally provided as the previous virtual image data is corrected and replaced.

Specifically, when the virtual image data (i.e., the second virtual image data) at a specific playback time point (i.e., the second time point) is missing and played, the AR content is not displayed at the correct location in a reality space; as the virtual image data is received after the unit time has elapsed (i.e., the third time point), the location of AR content suddenly is moved and thus image shaking occurs. In other words, when the first virtual image data (i.e., the first frame) is directly changed to the third virtual image data (i.e., the third frame) as the second frame is missing, it may cause dizziness to a user because an object is displayed as if the object is suddenly moved. As the correction image data at the second time point is provided using the first virtual image data at the first time point, the user may provide AR content positioned at the correct location in a reality space without shaking by filling an unreceived image frame (i.e., the second virtual image data) with an alternative frame (i.e., second correction image data based on the first virtual image data). In particular, when virtual image data is frequently missing as the client 200 receives virtual image data from the server 100 through the wireless communication, it is possible to provide a more useful effect.

Figure 9:
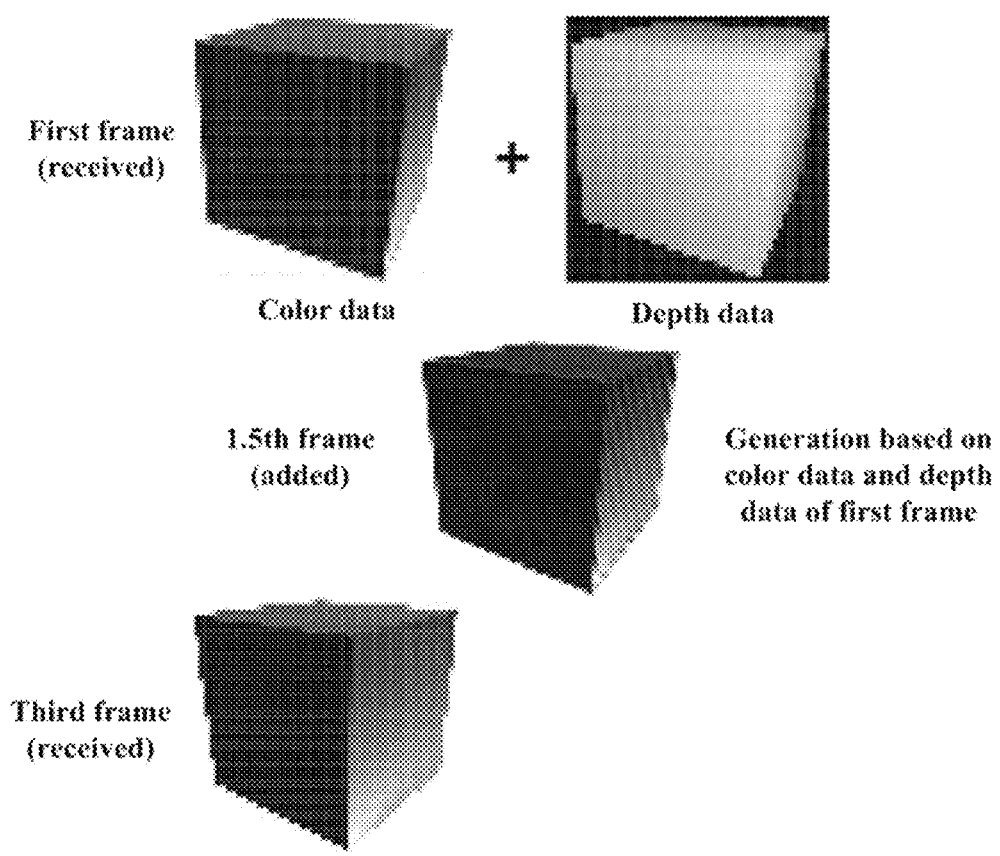
FIG. 9 is an exemplary view illustrating a process of adding the 1.5th frame between a first frame and a second frame, according to an embodiment of the inventive concept.

Furthermore, in another embodiment, as illustrated in FIG. 9, the client 200 may generate and provide an additional frame for filling a time point between frames (i.e., virtual image data) generated and provided by the server 100. For example, when the server 100 provides only 60 frames per second, the client 200 may generate an additional frame corresponding to a time point between frames provided by the server 100 and then output 120 frames per second. That is, the server 100 has no choice but to provide the limited number of frames (e.g., 60 frames per second) to the client 200 due to various factors such as server performance or network bandwidth limitation; in this case, the client 200 may increase the number of frames per second by itself to generate a more natural image.

The additional frame (i.e., the 1.5th frame) between the first frame and the second frame is generated through correction of the first frame. That is, the client 200 compares the acquisition location data and the image direction data, which are included in the first frame (i.e., the first virtual image data), and the current location data and the playback direction data, which are obtained from the client 200 at the 1.5th time point, at which the frame is to be added, and then generates the comparison result (i.e., the difference in location in a space and the difference in viewing direction). Afterward, the client generates the 1.5 frame by adjusting the location of each pixel in the first frame (i.e., the first virtual image data) based on the comparison result. Furthermore, in another embodiment, the display location determining step S140 may further include the step of adjusting, by the client 200, the color or chroma of each pixel in the virtual image data. That is, the client 200 adjusts the color or chroma of each pixel based on the light irradiation direction of the reality space or the placement location (i.e., a location where pixels are arranged in a 3D space) of each pixel. In this way, the client 200 may allow the virtual image data provided by the server 100 to be displayed naturally in the reality space.

The client 200 displays the virtual image data in a reality space based on the determined location (S160; a step of displaying virtual image data). In an embodiment, when the client 200 is a device (e.g., a glass-type wearable device) for viewing virtual space data displayed on a transparent display upon directly viewing the reality space through a transparent display, the client 200 displays AR content (e.g., image content masked based on depth data on virtual image data), on which a location where each pixel is to be displayed is determined, on a transparent display.

Furthermore, in another embodiment, a step of correcting, by the client 200, the reality image data based on the output delay time may be further included when the client 200 is a device for outputting the combined image data obtained by combining the virtual image data and the reality image data, which are obtained by the camera (e.g., in the case of a smartphone or a tablet PC), the client 200. The output delay time is the time required until the captured reality image data is output on a screen after the reality image data is captured. That is, the client 200 corrects the reality image data displayed on the screen to match the reality space observed by the client 200 at the same time point by reflecting the reality image data to the movement of the client 200. For example, when obtaining reality image data the same as the screen size through the camera, the client 200 shifts reality image data based on the movement of the client 200 and then displays the shifted reality image data on the screen. Furthermore, for example, when the client 200 obtains reality image data larger than the screen size, the client 200 extracts and displays the region to be output on the screen by reflecting the movement of the client 200 in the obtained reality image data.

Referring to FIG. 1, according to another embodiment of the inventive concept, an AR image providing device using depth data may include a virtual image data receiving unit 210, a control unit 220, and an image output unit 230. The AR image providing device according to an embodiment of the inventive concept corresponds to the client 200 in an AR image providing method using depth data according to an embodiment of the inventive concept. The detailed description of the above-described content will be omitted.

The virtual image data receiving unit 210 of the client 200 receives virtual image data from the server 100. The virtual image data includes color data and depth data. The virtual image data receiving unit 210 may receive color data and depth data of each pixel through a separate channel. That is, the virtual image data receiving unit 210 receives color data (e.g., a RGB value) of each pixel through a color data channel and receives depth data of each pixel through a depth data channel.

The virtual image data receiving unit 210 receives virtual image data through wired or wireless communication. In the case of reception via wireless communication, the virtual image data receiving unit 210 may correspond to a wireless Internet module or a short-range communication module.

The wireless Internet module is a module for wireless Internet access and may be embedded in a mobile terminal 100 or may be attached on the mobile terminal 100. The wireless Internet technology may include Wireless LAN (WLAN) (Wi-Fi), Wireless broadband (Wibro), World Interoperability for Microwave Access (Wimax), High Speed Downlink Packet Access (HSDPA), long term evolution (LTE), Long Term Evolution-Advanced (LTE-A), or the like.

The short range communication module refers to a module for short range communication. The short range communication technology may include Bluetooth, Bluetooth Low Energy (BLE), Beacon, Infrared Data Association (IrDA), Ultra-Wideband (UWB), ZigBee, or the like.

The control unit 220 processes the virtual image data received through the virtual image data receiving unit 210. In an embodiment, the control unit 200 of the client 200 determines a location, at which each pixel is to be displayed in a reality space, based on the depth data.

Moreover, the control unit 220 determines whether to process pixels corresponding to each depth transparently based on the depth data. That is, the control unit 220 transparently processes pixels corresponding to the remaining depth range other than an object located in a specific depth range, and thus only the specific object is displayed on the screen.

Furthermore, when virtual image data (i.e., the second virtual image data at the second time point) at a specific playback point is missing, the control unit 220 generates correction image data for replacing the missing image data using the immediately-previous virtual image data (i.e., the first virtual image data at the first time point). Furthermore, when the acquisition location or image direction (i.e., the direction in which the image was acquired) of virtual image data is not matched with the current location of the client 200 and the direction (i.e., a playback direction) observed by the client 200, the control unit 220 corrects image data and generates correction image data positioned at the correct location in the reality space.

The image output unit 230 displays the virtual image data in a reality space based on the determined location. In an embodiment, when the client 200 is a device (e.g., a glass-type wearable device) for viewing virtual space data displayed on a display upon directly viewing a reality space through a transparent display, the image output unit 230 may be a transparent display for displaying AR content generated based on virtual image data.

Figure 8:
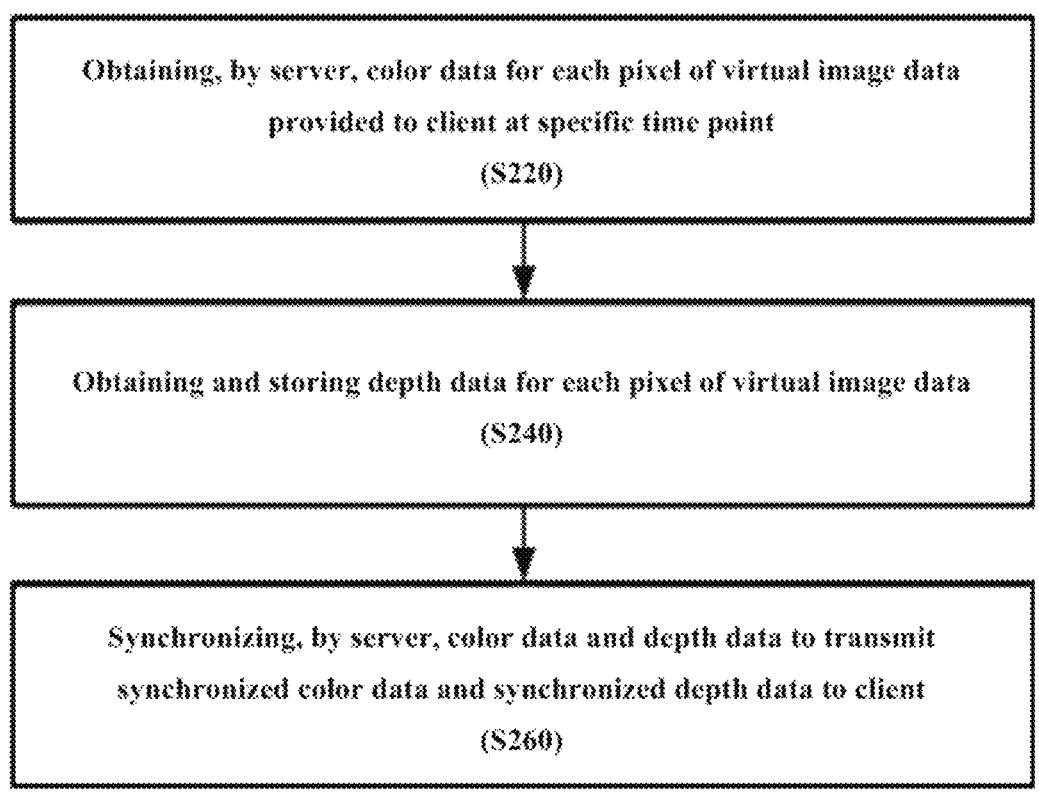
FIG. 8 is a flowchart of a method, in which a server generates and provides virtual image data including depth data, according to an embodiment of the inventive concept.

FIG. 8 is a flowchart of a process in which the server 100 generates and provides an AR image including depth data to the client 200 according to another embodiment of the inventive concept.

Referring to FIG. 8, according to another embodiment of the inventive concept, a method of providing an AR image using depth data includes a step of obtaining, by the server 100, color data for each division unit of the virtual image data provided at a specific time to the client 200 (S220), a step of obtaining and storing depth data for each divided unit of the virtual image data (S240), and a step of synchronizing, by the server 100, the color data and the depth data to transmit the synchronized color data and depth data to the client 200 (S260).

The server 100 generates virtual image data to be provided to the client 200. The virtual image data includes a plurality of division units, and includes color data and depth data for each division unit. The division unit may correspond to a pixel of image data. When the second virtual image data at the second time point is not received, the depth data is used during correction based on first virtual image data at the first time point; the second time point is a time point at which the virtual image data transmission period elapses from the first time point.

The server 100 obtains color data and depth data for each division unit (e.g., a pixel) (S220 and S240). The server 100 synchronizes the color data and the depth data to transmit the synchronized color data and depth data to the client 200 (S260). The server 100 may transmit the synchronized color data and depth data to the client 200 through separate channels.

Furthermore, in another embodiment, the virtual image data further includes acquisition location data and image direction data. The client 200 compares current location data with the acquisition location data, compares playback direction data with the image direction data, and adjusts a location of a pixel in the virtual image data based on the comparison result. The current location data and the playback direction data are obtained by the client 200 in real time or at a unit time.

Hereinabove, according to an embodiment of the inventive concept, a method for providing AR image may be implemented by a program (or an application) and may be stored in a medium such that the program is executed in combination with a computer being hardware.

The above-described program may include a code encoded by using a computer language such as C, C++, JAVA, a machine language, or the like, which a processor (CPU) of the computer may read through the device interface of the computer, such that the computer reads the program and performs the methods implemented with the program. The code may include a functional code related to a function that defines necessary functions that execute the method, and the functions may include an execution procedure related control code necessary for the processor of the computer to execute the functions in its procedures. Further, the code may further include additional information that is necessary for the processor of the computer to execute the functions or a memory reference related code on which location (address) of an internal or external memory of the computer should be referenced by the media. Further, when the processor of the computer is required to perform communication with another computer or the server 100 in a remote site to allow the processor of the computer to execute the functions, the code may further include a communication related code on how the processor of the computer executes communication with another computer or the server 100 or which information or medium should be transmitted and received during communication by using a communication module of the computer.

The stored medium refers not to a medium, such as a register, a cache, or a memory, which stores data for a short time but to a medium that stores data semi-permanently and is read by a device. In detail, for example, the stored medium may include a read only memory (ROM), a random access memory (RAM), a CD-ROM, a magnetic tape, a floppy disk, and an optical data storage device, but the inventive concept is not limited thereto. That is, the program may be stored in various recording media on various servers 100 that the computer may access, or various recording media on the computer of the user. Further, the media may be dispersed in a computer system connected to the medium through a network, and codes that may be read by the computer in a dispersion manner may be stored.

The inventive concept has the following various effects.

First, in the case where the spatial placement of an object (e.g., a marker) with which an AR image is combined is changed as a user moves, the AR image may be displayed at the correct location in a reality space and may be played naturally without shaking by providing correction image data capable of replacing the missing image frame at a specific time point.

Second, as depth data is combined with two-dimensional virtual image data composed of color data, it is possible to naturally display 2D virtual image data in a 3D reality space. That is, an AR image playing device recognizes the 3D reality space and displays each pixel of the 2D image at an appropriate depth, thereby providing an effect of realizing 3D AR.

Third, because it is possible to determine the level of transparency processing based on depth data applied to each pixel in the virtual image data produced for VR, a VR image may be directly utilized for an AR image based on the depth data obtained when virtual image data is obtained without the need to produce a separate AR image.

Although embodiments of the inventive concept have been described herein with reference to accompanying drawings, it should be understood by those skilled in the art that the inventive concept may be embodied in other specific forms without departing from the spirit or essential features thereof. Therefore, the above-described embodiments are exemplary in all aspects, and should be construed not to be restrictive.

The inventive concept has the following various effects.

First, in the case where the spatial placement of an object (e.g., a marker) with which an AR image is combined is changed as a user moves, the AR image may be displayed at the correct location in a reality space and may be played naturally without shaking by providing correction image data capable of replacing the missing image frame at a specific time point.

Second, as depth data is combined with two-dimensional virtual image data composed of color data, it is possible to naturally display 2D virtual image data in a 3D reality space. That is, an AR image playing device recognizes the 3D reality space and displays each pixel of the 2D image at an appropriate depth, thereby providing an effect of realizing 3D AR.

Third, because it is possible to determine the level of transparency processing based on depth data applied to each pixel in the virtual image data produced for VR, a VR image may be directly utilized for an AR image based on the depth data obtained when virtual image data is obtained without the need to produce a separate AR image.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method in which a client provides an augmented reality (AR) image, the method comprising:
receiving, by the client, virtual image data from a server, wherein the virtual image data includes color data and depth data;
determining, by the client, a location, at which each pixel is to be displayed in a reality space, based on the depth data; and
displaying the virtual image data in the reality space based on the determined location,
wherein the determining of the location comprises:
determining, by the client, a specific depth as a transparency adjustment criterion, which is to set a boundary line of content to be displayed on a screen; and
determining whether to perform transparency processing, by distinguishing a depth range based on the transparency adjustment criterion,
or
wherein the determining of the location comprises:
comparing current location data obtained by the client with acquisition location data included in the virtual image data, and comparing playback direction data obtained by the client with image direction data also included in the virtual image data; and
adjusting a location of a pixel in the virtual image data based on the comparison result,
or
wherein the displaying the virtual image data comprises:
correcting, by the client, which is a device for outputting combined image data obtained by combining the virtual image data and reality image data obtained by a camera, the reality image data based on an output delay time, which is a time required until, after the reality image data is captured, the captured reality image data is output on a screen.

2. The method of claim 1, wherein the depth data is included in a separate channel distinguished from a color data channel for each pixel, and
wherein the depth data and the color data are synchronized and transmitted.

3. The method of claim 1, wherein the virtual image data is a two-dimensional image stored for each pixel by obtaining depth data at each point during capture or generation.

4. The method of claim 1, wherein the depth range is a plurality of regions divided based on a plurality of depths by setting the plurality of depths depending on the transparency adjustment criterion.

5. The method of claim 1, wherein the determining of the location further includes:
adjusting, by the client, a color or a chroma of each pixel in the virtual image data based on a light irradiation direction of the reality space.

6. A non-transitory computer-readable recording medium storing a program for providing an AR image using depth data, and configured to be coupled to a computer being hardware, the program includes instructions to execute the method of claim 1.

7. A device providing an AR image, the device comprising:
a processor configured to
receive virtual image data from a server, wherein the virtual image data includes color data and depth data;
determine a location, at which each pixel is to be displayed in a reality space, based on the depth data; and
control a screen to display the virtual image data in the reality space based on the determined location,
wherein the processor is further configured to:
determine a specific depth as a transparency adjustment criterion, which is to set a boundary line of content to be displayed on a screen; and
determine whether to perform transparency processing, by distinguishing a depth range based on the transparency adjustment criterion,
or
wherein the processor is further configured to:
compare current location data with acquisition location data included in the virtual image data, and comparing playback direction data with image direction data also included in the virtual image data; and
adjust a location of a pixel in the virtual image data based on the comparison result,
or
wherein the processor is further configured to:
output combined image data obtained by combining the virtual image data and reality image data obtained by a camera; and
correct the reality image data based on an output delay time, which is a time required until, after the reality image data is captured, the captured reality image data is output on a screen.

8. A method in which a server generates virtual image data for implementing AR in a client, the method comprising:
obtaining, by the server, color data for each pixel of the virtual image data provided to the client at a specific time point;
obtaining and storing depth data for each pixel of the virtual image data; and
synchronizing, by the server, the color data and the depth data to transmit the synchronized color data and the synchronized depth data to the client,
wherein the depth data is used during correction based on first virtual image data at a first time point when second virtual image data at a second time point is not received, and
wherein the second time point is a time point at which a virtual image data transmission period elapses from the first time point.

9. The method of claim 8, wherein the virtual image data further includes acquisition location data and image direction data,
wherein the client compares current location data with the acquisition location data, compares playback direction data with the image direction data, and adjusts a location of a pixel in the virtual image data based on the comparison result, and
wherein the current location data and the playback direction data are obtained by the client in real time or at a unit time.

* * * * *